United States Patent [19]

Lowrey, III

[11] 4,452,227

[45] Jun. 5, 1984

[54] ACTIVE THERMAL STORAGE USING THE GROUND UNDERLYING A SOLAR POND

[76] Inventor: O. Preston Lowrey, III, 1009 Burch Ave., Durham, N.C. 27701

[21] Appl. No.: 388,416

[22] Filed: Jun. 14, 1982

[51] Int. Cl.³ .............................................. F24J 3/02
[52] U.S. Cl. .................................. 126/415; 126/400; 126/436; 126/437
[58] Field of Search ................. 165/18; 126/400, 415, 126/416, 430, 436, 437

[56] References Cited

U.S. PATENT DOCUMENTS

| | | | |
|---|---|---|---|
| 1,209,956 | 12/1916 | Gesell | 126/415 |
| 2,428,876 | 10/1947 | Hawkins | 126/415 |
| 3,077,190 | 2/1963 | Allen | 126/415 |
| 3,411,163 | 11/1968 | Myers | 126/415 |
| 3,931,851 | 1/1976 | Harris | 126/416 |
| 3,933,628 | 1/1976 | Varani | 126/415 |
| 4,091,800 | 5/1978 | Fletcher | 126/415 |
| 4,227,511 | 10/1980 | Margen | 126/415 |
| 4,228,788 | 10/1980 | Moeser | 126/437 |
| 4,235,221 | 11/1980 | Murphy | 165/18 |
| 4,258,661 | 3/1981 | Margen | 126/416 |
| 4,283,913 | 8/1981 | Loeb | 126/415 |
| 4,286,574 | 9/1981 | Vrolyk | 126/430 |
| 4,328,788 | 5/1982 | Wirguin | 126/400 |
| 4,345,581 | 8/1982 | Shacher | 126/415 |
| 4,361,135 | 11/1982 | Metz | 126/437 |
| 4,377,071 | 3/1983 | Assaf | 126/415 |
| 4,380,993 | 4/1983 | Spitzer | 126/437 |

Primary Examiner—Daniel J. O'Connor

[57] ABSTRACT

An apparatus is presented for actively using the ground underlying a solar pond for storage of heat accumulated in the pond. Heated water will be injected down shallow wells and percolated through the soil. Recovery of heat will usually just reverse this injection. With this invention both major components will perform better than they would alone. Solar ponds will now have huge, cheap, thermal storage without requiring extra brine. In addition, the ground will be insulated by the overlying solar pond so heat losses will be low and heat recovery efficiency quite high. Embodiments of the basic strategy—thermal storage in permeable material insulated by the overlying solar pond—can be economically adapted to a wide variety of solar pond applications and locations. For example, where impermeable rock underlies a pond site a pond should be designed with a very deep, lined bottom zone filled with gravel. A small amount of brine will fill and circulate through the voids in this gravel. This embodiment also gives the large insulated thermal storage desired.

6 Claims, 5 Drawing Figures

ACTIVE THERMAL STORAGE USING THE GROUND UNDERLYING A SOLAR POND

FIELD OF INVENTION

This invention relates to solar ponds. More specifically, this invention relates to apparatus for providing active thermal storage in solid material associated with the solar pond, such as the ground beneath a solar pond, or gravel placed in the bottom of a solar pond.

BACKGROUND OF THE INVENTION

Solar ponds are a radically different inexpensive approach to building a solar collector. They are usually constructed using clear, stratified salt water usually two to three meters deep and varying from nearly saturated brine at the bottom to nearly fresh water at the top. Because of this salt gradient, lower layers remain too dense to rise through the lighter overlying layers, even when heated. That means convection is suppressed. Much of the incident sunshine penetrates to the pond between where it warms the adjacent brine layers to 70° to 110° C., that is, until heat losses neutralize further temperature increase. The pond's upper layers thus act as insulation for the lower layer and underlying ground.

The predominant heat loss is conduction upward through the pond driven by the established thermocline. Heat is also conducted into the ground below a new pond until this ground becomes well heated and this loss ceases. There can be losses to ground water currents flowing beneath a pond and sometimes these may need to be controlled. There are losses by conduction around the pond edges. Usually very expansive ponds are designed. Then edge losses (proportional to perimeter) become minor compared with conduction losses upward through the pond layers (proportional to area).

Solar ponds actually develop three zones. The surface zone (0.2 meters deep) is stirred by the wind and has an essentially uniform salt concentration and temperature. Below this is a well stratified convection suppressing zone in which density, temperature and salt concentration increase with depth. This is sometimes called the thermohalocline. Daily fluctuating pond floor temperatures stir the bottom zone so it also has a uniform temperature and salinity.

To extract heat from ponds, the bottom zone is decanted slowly enough so that it does not stir the overlying nonconvecting zone. The heat from this brine could then be used for space heating, industrial process heating, salt production, desalinization, in absorption air-conditioning or Rankine cycle power generation.

Small ponds will usually be constructed by bulldozing an embankment around the pond floor area and laying a rubber or plasticized liner across the floor and embankments. The stratified layers can then be developed by first filling the pond halfway with brine, then sliding a fresh water layer on top of this. Salt diffusion gradually produces the even stratification.

Often the nearly saturated, very hot, bottom zone of the pond is intentionally made thicker to augment heat storage. The ground underlying a pond contributes additional thermal storage. As a rule of thumb, the ground storage effectively penetrates to one meter, a depth determined by heat conduction rates and the likely lenght of storage cycles. This intrinsic storage makes solar ponds reliable and responsive to changing consumer demand. Heat can be withdrawn to match almost any demand, day, night, or in bad weather. In contrast, lack of thermal storage and reliability cripples many other solar strategies.

This method of increasing thermal storage in the bottom of solar ponds is expensive, and therefore not included to the extent which could be used. At many potential pond sites brine is already expected to be the biggest contributor to costs. Brine cost is especially high when solid salt must be brought to a site by truck. This will commonly be necessary for most ponds designed to provide space, water, or process heating. Since the bottom zone of ponds contain a nearly saturated brine, we simply compound the salt requirements and cost problem for these pond types if we thicken this zone to augment thermal storage.

Moreover, greater thermal storage could often be used than economics will allow. For example, greater storage would further smooth out variations in diurnal demand, in the supply of sunshine, or caused by long stretches of bad weather. In addition, much vaster storage could neutralize the summer to winter variation in solar energy incident on ponds. This annual variation increases acutely with distance from the equator. Also, some types of demand will be seasonal, for example, space heating. Vast thermal storage could actually save summer solar energy for use in the next winter.

OBJECTS

The general object of my present invention is to provide a means to develop large amounts of thermal storage associated with solar ponds without greatly increasing the amount of highly concentrated brine required.

It is a further object of my present invention to insulate said thermal storage by locating it beneath the insulating layers of the solar pond.

It is a further object of my present invention to provide means for extracting the heat from storage with high efficiency.

It is a further object of my present invention to provide said large amounts of thermal storage adaptable to association with a wide variety of pond sites and types.

Further objects and advantages of my invention will become apparent from a consideration of the drawings and ensuing description thereof.

SUMMARY OF THE INVENTION

The invention realizes these objects by storing heat in a large mass of material such as earth underlying a pond, or gravel placed in the bottom zone of the pond. This mass of solid material will be greater than the mass of earth normally heated by conduction through the pond floor. Use of this mass of solid material will reduce or eliminate the need for most of the bottom zone of a pond and its often costly brine. In order to both heat this mass and later extract heat from it, a fluid will be circulated throught the mass. Normally this fluid will be either the pond bottom brine or fresh water heated by heat exchange with the pond. The insulating pond layers insulate this underlying mass of solid material just as they insulate the pond bottom zone. Consequently heat stored in this solid material is not lost any more than heat stored in the bottom zone would be. In the detailed description of the invention a variety of embodiments suitable to different pond locations and applications are explained.

The invention will be more fully described with reference to the accompanying drawings in which:

FIG. 1 shows the preferred embodiment of augmented thermal storage using the natural earth underlying a pond. This involves injection of fresh water heated by the brine from the pond in a conventional heat exchanger.

FIG. 2 shows an alternative embodiment which eliminates the conventional heat exchanger from the thermal storage loop shown in FIG. 1. Here fresh water is trickled on the surface beneath the pond liner, heated by contact with the hot ground there, and percolates downward. Percolation is promoted by suction pumping from wells.

FIG. 3 shows another embodiment useful for a pond where a liner is not used. Brine from the pond bottom zone is circulated directly through the underlying ground. This can be enhanced using wells and pumps.

FIG. 4 shows an alternative embodiment wherein there is a deep thermal storage bottom zone located conventionally above the pond liner but this zone is nearly filled with gravel or rubble. Brine occupies only the voids in this gravel. Brine is circulated through the gravel to promote both thermal storage or heat extraction.

FIG. 5 shows the detail of where the fresh water is trickled in the embodiment in FIG. 2.

DETAILED DESCRIPTION OF THE INVENTION

Figure 1:
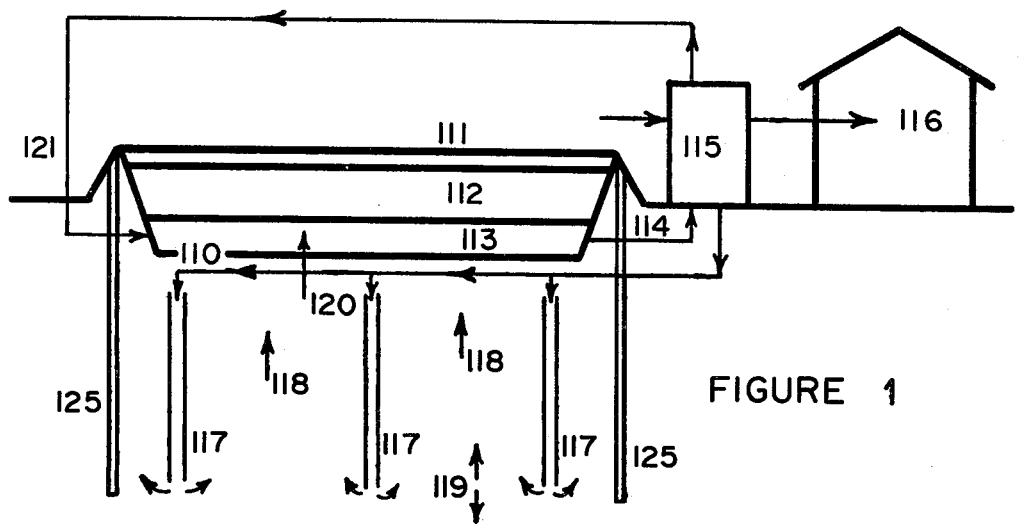

In FIG. 1 I have shown a solar pond which has the normal pond liner 110, surface layer 111, nonconvection layer 112, and a bottom convective zone 113 which is not highly thickened to augment thermal storage. Sometimes heat will be withdrawn and used immediately, for example, for district space heating. Then hot brine is withdrawn from the pond 114. Usually the brine would be heat exchanged 115 with a second fluid such as fresh water, and the fresh water distributed for space heating 116. The cooled brine would be returned to the pond, 121. At other times, such as in the summer, heat is to be stored instead of used immediately. The hot brine is withdrawn from the pond 114 and heat exchanged with fresh water 115. Then this hot fresh water is pumped down one or more shallow wells, 117, evenly distributed beneath the solar pond. Thus hot fresh water is injected into the adjacent earth. Because of its low density, this hot fresh water will tend to rise, 118, back toward the top of the water table, surrendering heat to the cooler earth it passes through. This strategy assumes the water table is above the well bottoms. Heat will also be conducted both upward and downward from the well bottom injection point 119. Thus all the earth from the surface down to below the well bottoms could be heated to nearly the temperature of the injection water which could approach 100° C. Moreover, the well bottom injection depth could easily be varied to provide the amount of thermal storage desired.

At a later time, this stored heat could be extracted by two methods, used either separately or in combination. Withdrawing alot of hot brine 114 such as for space heating in winter, would cool the pond bottom zone 113. Then heat from the underlying warmer ground would conduct upward 120 and reheat this bottom zone 113. Alternatively, stored heat could be extracted by pumping hot fresh water out, rather than into the network of shallow wells 117. This hot fresh water might be clean enough to be distributed directly to the end use rather than first heat exchanged.

Flow of cooler water streams under the pond could carry away much of this stored heat. To exclude such streams, a nearly vertical barrier, 125, in FIG. 1, could be implanted extending from the vacinity of the pond embankment to the maximum ground depth of this thermal storage. This barrier could be placed on just the upstream side of the pond or fully around the perimeter. Notice that any cool streams at a depth below this barrier will not rise into and mix with the hot water in the storage zone because cool water is denser than hot water. Also these barriers could be made of insulating material to reduce heat losses from around the pond edges by conduction.

Figure 2:
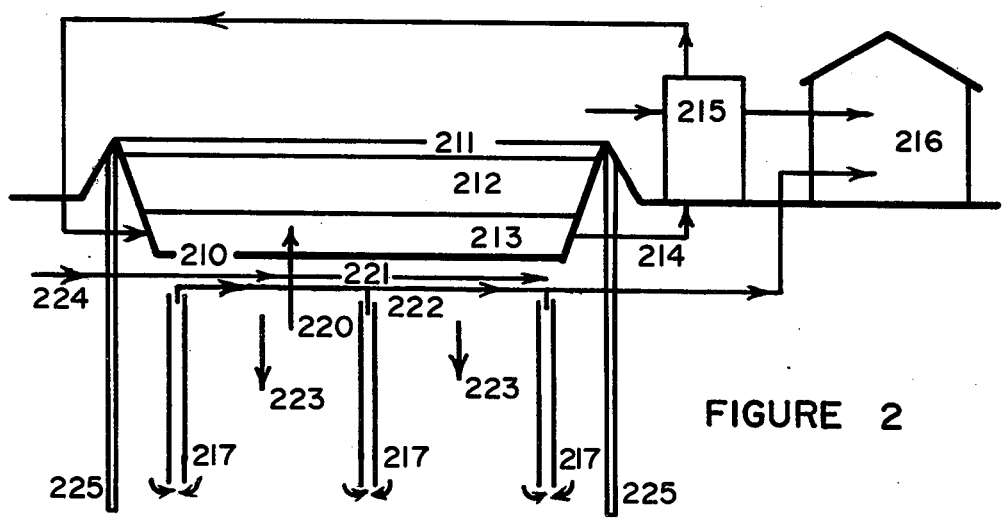
Figure 5:
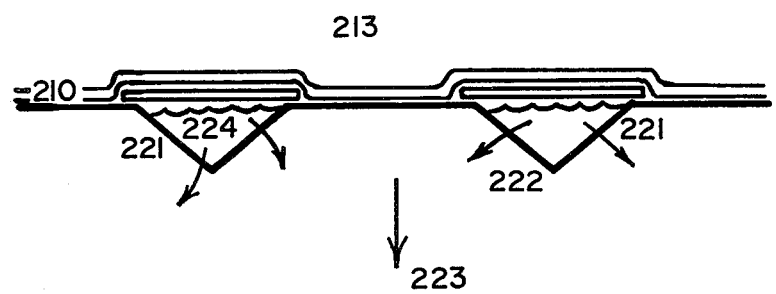

The embodiment in FIG. 1 relies on the hot water rising from the wells back toward the surface 118. Therefore this method will not be viable if the water table is deep beneath a pond since then no water could rise to near the surface. In addition, the embodiment discussed in FIG. 1 requires a large conventional heat exchanger, 115. In FIG. 2 and FIG. 5 I have shown an alternative embodiment that overcomes these disadvantages. FIG. 2 shows a solar pond which has the normal pond liner 210, surface layer 211, nonconvective layer 212, and a bottom zone which has not been thickened 213. If heat is to be used immediately brine would be withdrawn, 214, from the bottom zone, preferably heat exchanged, 215, with a second fluid such as fresh water, and applied to a task such as space heating, 216. At other times heat would be stored in the ground as follows. Placed on the ground surface under the pond liner 210 would be a network of covered furrows 221. Fresh water 224 would be distributed through this network and thus trickled on the soil 222 just below the pond liner, much like with furrow irrigation. This fresh water would quickly be heated by the hot soil and proximity to the pond bottom zone 213. Because there is a deep water table, the heated fresh water would then percolate downward, 223, heating earth at a greater depth. One or more shallow wells, 217, connected to a pump could extract fresh water lowering the water table and thus the depth to which heat was carried.

At a later time this stored heat could be extracted by the same two methods discussed for the embodiment in FIG. 1, either separately or in combination. Withdrawing a lot of hot brine 214 such as for space heating in winter, would cool the pond bottom zone 213. Then heat from the underlying heated ground would conduct upward 220 and reheat this zone 213. Alternatively, stored heat could be extracted by pumping fresh water out of the one or more shallow wells 217. This fresh water might not have to be heat exchanged before it could be distributed to the end use, 216.

Again, to exclude cool ground water streams a vertical barrier, 225, could be implanted extending from the vacinity of the embankment to the maximum ground depth of thermal storage. This barrier could be placed on just the up-stream side of the pond or more fully around the perimeter.

Figure 3:
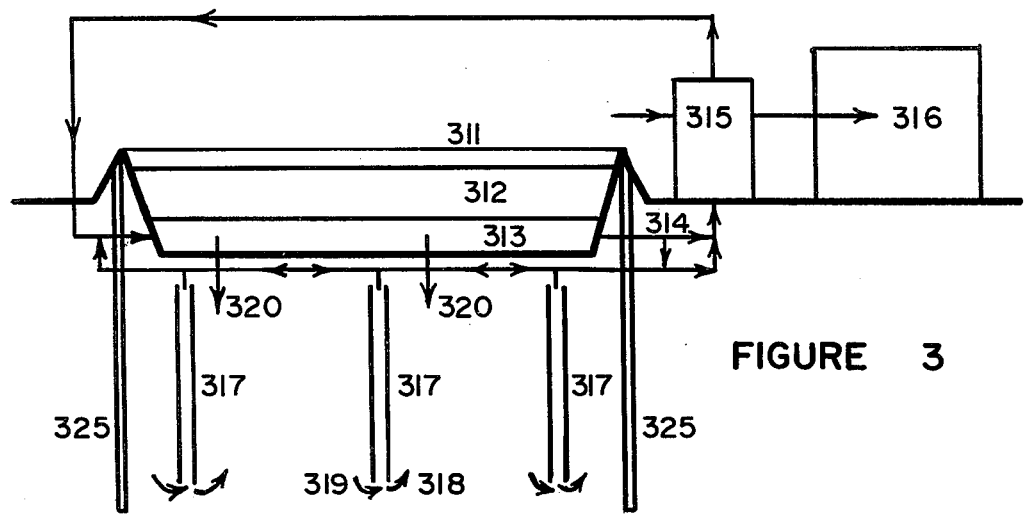

In FIG. 3 I have shown another embodiment of augmented thermal storage in the earth beneath a solar pond. This embodiment is useful where ponds are built without a liner. This might occur at very large pond complexes designed to produce electrical power at desert lake sites. FIG. 3 shows a solar pond which has the normal surface layer 311, a nonconvective layer 312, and a bottom convective zone 313, but no pond liner. Sometimes heat will be withdrawn from the pond and used immediately rather than stored, for example, for electric power production. Then hot brine would probably be withdrawn from the pond 314, heat exchanged with a second fluid 315, such as with a power cycle working fluid, and applied to an end use such as electric power production, 316.

Heat would be stored in the ground by circulating hot brine through the sediment undelying the pond. Hot brine could be drawn from the pond 314, and injected down one or more shallow wells underlying the pond 317, and into the adjacent ground 318. Alternatively, brine could be pumped from 319 said one or more shallow wells 317, promoting seepage of hot brine through the pond floor 320 from the bottom zone 313 since there is no pond liner. The brine pumped out could be returned to the pond bottom zone, 313, for reheating.

At a later time this stored heat could be extracted by methods similar to the two methods discussed for the embodiment in FIG. 1, either separately or in combination. Withdrawing a lot of hot brine 314 from the pond bottom zone 313 such as in winter, would cool the pond bottom zone 313. Then heat from the underlying warmed ground would conduct and convect upward 320 and reheat this zone 313. Alternatively, stored heat could be extracted by pumping hot brine out 319 of the one or more shallow wells 317. This brine would probably be heat exchanged 315 before it could be applied to the end use.

Again to exclude cool ground water streams, a vertical barrier, 325 in FIG. 3, could be implanted extending from the vacinity of the embankment to the maximum ground depth of thermal storage. This barrier could be placed on just the upstream side of the pond or fully around the perimeter. Ground water streams will not be common in the desert locations where this embodiment may be most practical. Therefore barriers are not expected to be often necessary with this embodiment.

Figure 4:
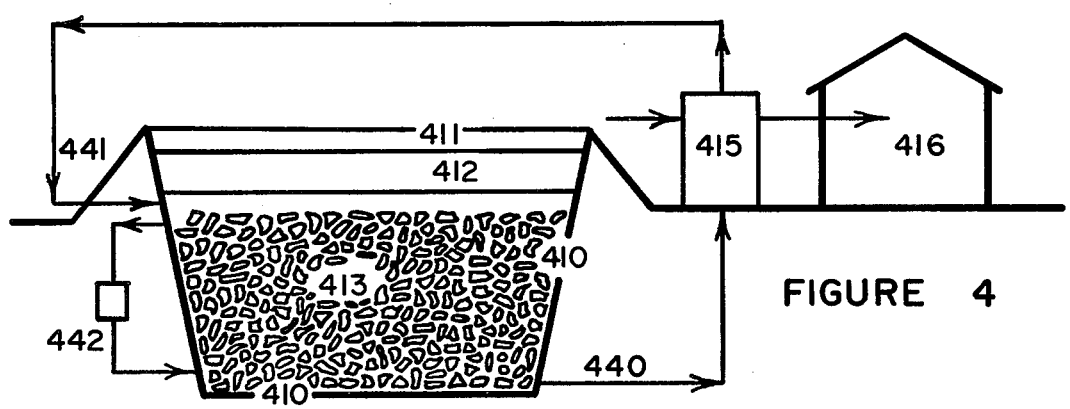

In FIG. 4 I have shown another embodiment which would be most useful at pond sites where circulation through the natural earth sediments was not practical such as if it was consolidated rock. FIG. 4 shows a solar pond which has the normal pond liner 410, surface layer 411, a nonconvective layer 412, and a deep bottom convective zone 413. Clean gravel, rubble, rocks, earth or other materials, hereinafter refered to as gravel, are layered in the bottom zone 413 and on top of the liner 410. Thus gravel replaces much of the volume of very concentrated brine that would normally fill a thick bottom zone. One or more circulating pumps 442 may be used to move brine through the gravel. This will promote heat exchange and thus thermal storage. In some designs the circulation necessary to affect heat storage in this deep bottom zone can be produced or assisted by natural convection patterns and/or by the placement of the brine extraction intake 440 and return line 441. For example, with the arrangement shown in FIG. 4, hot brine would be withdrawn at 440, probably be heat exchanged with a second fluid such as fresh water 415, and applied to an end use such as space heating 416. The brine would then be returned to the pond, 441. Between 441 and 440 the brine would absorb solar heat in the bottom zone, percolate down through the gravel, give up heat to any cooler gravel it contacted and finally reach 440. The direction of circulation in this loop containing 440 and 441 could be reversed if that produces more effective thermal storage and withdrawal from storage.

While the above description contains many specificities, these should not be construed as limitations on the scope of the invention, but rather as exemplifications of preferred embodiments thereof. Many other variations are possible, for example:

Instead of using one or more wells for injection into or withdrawal from the ground, we could use essentially horizontal pipe laid in trenches, or a combination of wells and horizontal pipes.

Heat from a solar pond does not have to be withdrawn exclusively by decanting the bottom zone. There may be schemes where some heat could be withdrawn from other layers or we could utilize a heat exchanger spread on the bottom of the pond. The augmented thermal storage of this invention could be used with other heat withdrawal methods.

The type of thermal storage described herein could be useful with any solar pond end use not just the space heating and electric power generation mentioned as examples. Many other end uses were mentioned in the introduction.

In the embodiments described in FIGS. 1 through 4, I mentioned heat exchange before distribution to the end use such as in step 115, 215, 315, and 415. This is not required by my invention. It is merely a likely means to reduce corrosion and maintainence in the end use distribution system.

Active thermal storage in the ground could be used in combination with a brine bottom storage zone, rather than replacing the latter entirely. This might be useful where demand varies rapidly such as at a peaking solar pond power plant. The brine bottom zone's thermal storage could probably be brought on line more swiftly than ground thermal storage.

In the design in FIG. 2, we could use a distribution network analogous to trickle irrigation instead of furrow irrigation. This network would consist of perforated tubes, however the tiny perforations are known to clog easily. This would be a great drawback for tubing inaccessibly positioned under a solar pond. Thorough prefiltering of the fresh water, 224, to prevent clogs probably would be an unattractive complication. Perhaps bigger perforations and/or intermittent trickling cycles could be used to insure satisfactory distribution without clogs. Of course intermittent trickling could also prove useful with furrow distribution. In addition, because the weight of the pond loads on the furrows, distribution through furrows could be mildly pressurized above one atmosphere. In some places this might be useful to increase seepage rates.

I believe eventually sophisticated flow and cycling patterns to optimize storage and meet all demand will be developed. Information on soil permeability, ground water level and currents and their variation, demand patterns, solar patterns, weather and climate will all be gathered then combined to give appropriate designs for a specific site. These optimized designs often will not fit precisely into one of the four main embodiments described herein and may combine and vary features from these embodiments. For example, the flow pattern of seepage, suction, and/or injection can be made more complex than I have described in these embodiments. Also, cycling into/out of storage can be much more frequent than within my example of annual cycling in association with space heating. Such designs may include simultaneous injection and withdrawal at different depths and regions beneath the pond. It may involve intermittent, irregular, or alternating suction and injection. Moreover injection or suction need not be from the well bottom only but could be along the lenght of a well or at different depths within a single well at different times.

The idea of convection suppressing or non-convecting solar ponds originated with the type of salt gradient pond I have described. Since then others have conceived non-convecting solar ponds based on different strategies. My invention of augmented thermal storage in the ground in association with a solar pond could be used with any or a combination of the different non-convecting strategies as well as with the salt gradient solar ponds. U.S. Pat. No. 4,138,992 describes methods for suppressing convection by adding gelling agents to increase the viscosity and by subdividing the solar pond into cells using translucent vertical and horizontal sheets. U.S. Pat. Nos. 4,244,351 and 4,283,913 describe the use of certain salts in saturated solutions whose solubility is sufficiently temperature dependent that the upward salt diffusion will not have to be counteracted. Rather the salt gradient will maintain itself by precipitating onto the pond floor any salt that diffuses up into cooler pond layers where it is insoluble. This idea is commonly called a saturated pond. U.S. Pat. No. 4,241,724 describes a method of suppressing convection in a fresh water pond using vertical and horizontal translucent sheets. Publications have described the idea of adding gelling agents to a pond so that the whole pond or the surface layer actually becomes rigid.

Accordingly, the scope of this invention should be determined not by the embodiments illustrated, but by the appended claims and their legal equivalents.

What is claimed is:

1. A thermal storage and retrival apparatus comprising:
   (a) a solar pond having a convection suppressing layer containing a thermocline;
   (b) a zone of permeable material comprised predominantly of the generally undisturbed ground which was at the site preceding construction of said solar pond, and predominantly located below said convection suppressing layer containing a thermocline, whereby said zone of permeable material is well insulated above by said convection suppressing layer;
   (c) means for circulating a fluid heated predominantly with heat collected in said solar pond through said zone of permeable material wherein one or more pumps and one or more shallow wells penetrating into said zone of permeable material are part of said means for circulating a fluid, whereby said heat can be transmitted to said permeable material in large amounts; and
   (d) means for removing stored heat as required from said zone of permeable material by forced circulating a fluid through said zone of permeable material, and/or by natural convection or conduction upward through said zone of permeable material into the overlying solar pond.

2. The apparatus of claim 1 including means for barring the flow of one or more ground water streams through said zone of permeable material, whereby heat losses to said one or more ground water streams can be controlled.

3. The apparatus of claim 1 wherein said fluid is essentially fresh water which is heated by a conventional heat exchange means, whereby a conventional heat exchanger could be installed and used for this purpose, or a conventional heat exchanger already available for use with the heat's end use, such as in distribution for district heating, might also be employed for heating said fresh water to be circulated through said zone of permeable material.

4. The apparatus of claim 1 wherein said fluid is essentially fresh water which is heated by being distributed on or near and in direct contact with the top of said zone of permeable material, which in turn is heated by conduction downward from said solar pond.

5. The apparatus of claim 1 wherein said solar pond has no pond liner, and said means of circulating a fluid involves pumping brine from said one or more shallow wells, thereby promoting seepage of hot brine through the floor of said solar pond.

6. A thermal storage and retrival apparatus comprising:
   (a) a solar pond having a convection suppressing layer containing a thermocline;
   (b) a zone of permeable material comprised predominantly of material placed within said solar pond during construction, whereby gravel could be placed in the bottom of a solar pond inside of the solar pond liner and function as part or all of said zone of permeable material, and predominantly located below said convection suppressing layer containing a thermocline, whereby said zone of permeable material is well insulated above by said convection suppressing layer;
   (c) means for circulating a fluid heating predominantly with heat collected in said solar pond through said zone of permeable material wherein one or more circulation pumps or extraction pumps are part of said means of circulating a fluid, whereby said heat can be transmitted to said permeable material in large amounts; and
   (d) means for removing stored heat from said zone of permeable material as required by forced circulating a fluid through said zone of permeable material, and/or by natural convection or conduction upward through said zone of permeable material into the overlying solar pond.

* * * * *

UNITED STATES PATENT AND TRADEMARK OFFICE
CERTIFICATE OF CORRECTION

PATENT NO. : 4,452,227
DATED : June 5, 1984
INVENTOR(S) : Preston Lowrey III

It is certified that error appears in the above-identified patent and that said Letters Patent are hereby corrected as shown below:

Column 1, line 22, change "between" to --bottom--;

Column 4, line 1, change "cooler water" to -- cooler ground water--;

Column 4, line 26, change "preferably" to --probably--.

Signed and Sealed this

Fifth Day of February 1985

[SEAL]

Attest:

DONALD J. QUIGG

Attesting Officer     Acting Commissioner of Patents and Trademarks